United States Patent [19]

Marpozan et al.

[11] Patent Number: 5,252,276

[45] Date of Patent: Oct. 12, 1993

[54] METHOD OF MAKING BOARD MADE OF LIGNITE ASH-SLAG, WOOD PARTICLES AND SYNTHETIC ADHESIVE

[75] Inventors: Sorin N. Marpozan, Staten Island, N.Y.; Delia G. Dimitriu; Gherghina Ciobanu, both of Bucharest, Romania

[73] Assignee: Logic S.R.L. & Logic Systems International Ltd., New York, N.Y.

[21] Appl. No.: 875,473

[22] Filed: Apr. 29, 1992

[30] Foreign Application Priority Data

Dec. 9, 1991 [RO] Romania .................. 148923

[51] Int. Cl.$^5$ ............................................ B29C 43/14
[52] U.S. Cl. ...................................... 264/120; 264/122
[58] Field of Search ......................... 264/120, 122, 119

[56] References Cited

U.S. PATENT DOCUMENTS

| | | | |
|---|---|---|---|
| 3,504,073 | 3/1970 | Rakszawski | 264/120 |
| 3,784,494 | 1/1974 | Domokos | 264/122 |
| 3,903,041 | 9/1975 | Bornstein | 264/120 |
| 4,073,848 | 2/1978 | Kuehn | 264/120 |
| 4,933,125 | 6/1990 | Reiniger | 264/120 |

*Primary Examiner*—Mary Lynn Theisen
*Attorney, Agent, or Firm*—Pennie & Edmonds

[57] ABSTRACT

A Logicore construction board, a method and a composition thereof involve use of lignite ash-slag, wood waste particles and a synthetic adhesive. Lignite ash-slag is a waste mineral product which is widely available, but presently has no use. The present invention solves an important ecological problem by converting the waste product into a useful product. Lignite ash-slag and a synthetic adhesive of urea-formaldehyde resin of P-type and a hardener of a predetermined resin to hardener ratio are first mixed. Separately, wood particles and the synthetic adhesive of a predetermined resin to hardener ratio are mixed. The two mixtures of the lignite ash-slag and the wood particles are then mixed together. The combined mixtures are then poured to form a blanket and then pressed at a room temperature followed by a heat press to form a board. The board is water-proof, fire-proof and corrosion-resistant.

7 Claims, No Drawings

METHOD OF MAKING BOARD MADE OF LIGNITE ASH-SLAG, WOOD PARTICLES AND SYNTHETIC ADHESIVE

FIELD OF THE INVENTION

This invention relates to a construction board and the like used in building construction, the method of making and the composition thereof.

BACKGROUND OF THE INVENTION

Widely available lignite ash-slag, which is a waste product presently of no use, poses an environmental problem. The present invention uses this environmental waste mineral product as a main component in making a construction board, such as a wall panel, isolated panel, floor board, etc.

It is conventional to use a construction board made of composite material, such as cement or gypsum mixed with wood particles. However, boards made of these composite materials are not economical and/or have weak or undesirable physical property in comparison with a board of the present invention. As disclosed in Obzornaia News Magazine, Number 2 (1987), manufacturing one cube meter (1 m$^3$) of a cement board consumes the following:
cement 770 kg
wood 280 kg
chemical product 50 kg
electrical energy 140–290 kwh
thermal energy 400 kcal
manufacture (human work) consumption 27 hours.

As evidenced above a cement board made from a mixture of cement and wood particles requires a huge consumption of energy and labor in the making thereof.

SUMMARY OF THE INVENTION

An object of the present invention is to provide a construction board made from a widely available, useless mineral waste product of lignite ash-slag and to solve an important ecological problem.

Another object of the invention is to provide a construction board which requires a low energy consumption in manufacturing thereof.

Another object of the invention is to provide a construction board of superior physical attributes, in particular, a board which is resistant to acid corrosion and which is water-proof and fire-proof.

Another object of the invention is to provide a method for carrying out the above-described object. i.e., the method of making the board.

In accordance with the present invention, the above noted objects may be carried out by using a lignite ash-slag mineral waste, waste wood particles and a synthetic adhesive. Since lignite ash-slag is an alkaline product, the board made from lignite ash-slag confers an excellent resistance to corrosion from acids. The lignite ash-slag board is also fire-proof, eliminating the step of a fire-proof treatment, saving manufacturing costs. The present lignite ash-slag board is also water-proof.

DETAILED DESCRIPTION OF THE INVENTION

A lignite ash-slag construction board of the present invention, hereafter "Logicore board", is water-proof, fire-proof and corrosion-resistant, as previously mentioned. The components of the Logicore board are lignite ash-slag, waste wood particles and a synthetic adhesive. As previously mentioned, lignite ash-slag is a waste mineral product which is widely available and poses environmental problems, but, to the best of the present inventors' knowledge, has no present use. The present invention solves an important ecological problem by converting this mineral waste product into useful products.

Lignite ash-slag is rather alkaline, having 7.5–8 pH. Therefore, lignite ash-slag product is resistant to acid corrosion. Lignite ash-slag has a density of 1.75 g/cm$^3$ and a large variety of granulation, the preferable granulation having a nominal diameter between 2.8–3.8 millimeter. Sieves or filters can be used to extract the desired granulation.

The wood waste products can be any of wood wastes such as splinters, preferably of beech or fir, sawdust and shavings.

The synthetic adhesive is based on an adhesive solution formed by widely available urea-formaldehyde resin of P-type and a hardener. The hardener can be obtained by dissolving in water at 23°–30° C. of the components by the weight percent in the order listed below:
1 weight % maleic anhydride
10 weight % ammonium chloride
10 weight % technic urea
10 weight % technic ammonia of 25% concentration (69 weight % water).

The temperature of the urea-formaldehyde resin poly-condensation, as well as the Logicore board, is relatively low, 155° C. This equates to a low consumption of energy in manufacturing the Logicore board.

Two different adhesive concentrations are used between ash-slag and wood waste particles. In particular, the ratio between the resin and the hardener is 9:1 for ash-slag and is 10:1 for waste wood particles. An example of glue preparation is as follows:

PREPARATION OF HARDENER SOLUTION

1. One gram of maleic anhydride is introduced and dissolved in a 100 ml vessel containing 10 ml of water at 25°–30° C.
2. Ten grams of ammonium chloride is introduced and dissolved in the vessel.
3. Ten grams of technic urea is introduced and dissolved in the vessel.
4. Ten (10) ml of technic ammonia of 25% concentration is introduced into the vessel and mixed.
5. Fifty-nine (59 ml) of water at 25°–30° C. is added into the vessel and mixed.
6. Homogenize the above mixture.

PREPARATION OF THE ADHESIVE SOLUTION

For the Lignite Ash-Slag: Mix nine (9) parts of urea-formaldehyde resin of P-type with one (1) part of the hardener obtained above to obtain 9:1 ratio between the resin and the hardener. Water is added as needed to change the viscosity thereof.

For the Wood Waste Particles: Mix ten (10) parts of urea formaldehyde resin of P-type with one (1) parts of the hardener obtained above to obtain 10:1 ratio between the resin and the hardener. Again, water is added as needed to change the viscosity thereof.

The method of manufacture is quite simple and merely requires conventional equipments such as a mill for brambling lignite ash-slag, a glue mixer, a mixer for mixing ash-slag with glue and wood waste particles with glue, a cold press, a hot press and a cutting device for sizing the board.

Lignite ash-slag and the synthetic adhesive obtained above are mixed in a vessel. Wood waste particles and the synthetic adhesive obtained above are mixed in another vessel. The mixture in the two vessels are then mixed together to form a homogenous wet Logicore mixture. Then the mixture is poured into a blanket. Thereafter, the blanket is pressed for about five minutes at a pressure of 15 kgF/cm². Thereafter, the cold pressed blanket is pressed in a hot press at 155° C., the temperature of the urea-formaldehyde resin poly-condensation, at a pressure of 30 kgF/cm² for about 20 minutes. The board obtained is cured for 5-7 days, thereafter is cut to the desired size for use as a construction board.

The specific consumption for a board having the dimension of 450 mm×450 mm×16 mm is as follows:
lignite ash-slag: 2100 gm
waste wood particles: 900 gm
synthetic adhesive: 350 gm.

EXAMPLE 1

A Logicore board is made as follows:
The weight ratio between lignite ash-slag, wood waste particles and synthetic adhesive is 65:20:15.

1. Formation of lignite ash-slag mixture: 2100 gm of lignite ash-slag is mixed at a room temperature (20° C.) with 250 gm of the synthetic adhesive obtained above (9:1 ratio between the resin and the hardener).

2. Formation of wood waste particle mixture: 900 gm of wood waste particles is mixed at a room temperature (20° C.) with 100 gm of the synthetic adhesive obtained above (10:1 ratio between the resin and the hardener).

3. Homogenization of the lignite ash-slag and wood waste particle mixtures: both mixtures obtained in steps 1 and 2 are mixed to obtain a homogenous Logicore mixture.

4. Formation of a blanket: the homogenous Logicore mixture is laid out into a blanket or a mat.

5. Cold press: the blanket is cold pressed at a room temperature for about 5 minutes at 15 kgF/cm² pressure.

6. Hot press: the cold pressed blanket is hot pressed at a temperature of about 155° C. for 20 minutes at 30 kgF/cm² pressure.

7. Curing: the hot pressed blanket is cured for 5-7 days.

8. Cut to size: the board is ready for cutting to desired size using any ordinary wood cutting tool and can then be used thereafter.

The physical and mechanical characteristics of the Logicore board are as follows in Table 1 below:

TABLE 1

| | Characteristics | Units of Measure | Values |
|---|---|---|---|
| 1 | Aspect | — | gray-black grits |
| 2 | Ash-slag grit (rest on 4 mm sieve) | % | 10 |
| 3 | Density | g/cm³ | 1.75 |
| 4 | pH | pH | 7.5-8 |
| 5 | Solid substance | % | 81.84 |
| 6 | Nontoxic volatile | % | 4.35 |
| 7 | Free carbon | % | 13.81 |
| 8 | Other waste material | % | 10-15 |

TABLE 1-continued

| | Characteristics | Units of Measure | Values |
|---|---|---|---|
| 9 | Humidity | % | 3-5 |

The bond characteristics are as follows in Table 2 below:

TABLE 2

| | Characteristics | Units of Measure | Values |
|---|---|---|---|
| 1 | Viscosity (Ford cup, 8 mm diameter) | sec | 65 |
| 2 | Reactivity | sec | 85 |
| 3 | Viable period | hour | >20 |

Table 3 below shows the test results of the strength of the present Logicore board.

TABLE 3

| | Test denomination | Test tubes and procedure | Result daN/cm² |
|---|---|---|---|
| 1 | Strength of materials at bending tension | Test in test-tube of 30 × 5 × 1.55-1.57 cm with W-type Monsanto tensiometer | 53 |
| 2 | Strength of materials at bending tension | Test in test-tube of 30 × 5 × 1.55 -1.57 cm with W-type Monsanto tensiometer | 55 |
| 3 | Strength of materials at bending tension | Test in test-tube of 30 × 5 × 1.55 -1.57 cm with W-type Monsanto tensiometer | 55 |
| 4 | Strength of materials at bending tension | Test in test-tube of 30 × 5 × 1.55 -1.57 cm with W-type Monsanto tensiometer | 64 |
| 5 | Strength of materials at bending tension | Test in test-tube of 30 × 5 × 1.55 -1.57 cm with W-type Monsanto tensiometer | 64 |
| | | Average value = | 58 |

Table 4 shows the test results of the thermal conductivity of the present Logicore board.

TABLE 4

| | Test denomination | Test tubes and procedure | Results W(m.K) | Kcal/mh°C. |
|---|---|---|---|---|
| 1 | Thermal conductivity at 0° C. | Test in test-tubes of 20 × 6 × 1.54-1.55 cm with T.M05 thermal conductivity test | 0.313 | 0.269 |
| 2 | Thermal conductivity at 0° C. | Test in test-tubes of 20 × 6 × 1.54-1.55 cm with T.M05 thermal conductivity test | 0.260 | 0.224 |
| 3 | Thermal conductivity at 0° C. | Test in test-tubes of 20 × 6 × 1.54-1.55 cm with T.M05 thermal conductivity test | 0.280 | 0.241 |
| 4 | Thermal conductivity at 0° C. | Test in test-tubes of 20 × 6 × 1.54-1.55 cm with T.M05 thermal conductivity test | 0.322 | 0.277 |
| 5 | Thermal conductivity at 0° C. | Test in test-tubes of 20 × 6 × 1.54-1.55 cm with T.M05 thermal | 0.313 | 0.269 |

TABLE 4-continued

| Test denomination | Test tubes and procedure | Results W(m.K) | Kcal/mh·C. |
|---|---|---|---|
| | conductivity test Average value = | 0.297 | 0.256 |

Table 5 shows the test results of certain physical properties of the present Logicore board.

TABLE 5

| | Test denomination | Denomination of test tubes and procedure | Results |
|---|---|---|---|
| 1 | Humidity | Test according to STAS 9492/73 in test tubes of 50 × 50 mm | 5.54% |
| 2 | Inflation | Test according to STAS 5884-75 in test tubes of 50 × 50 mm | 11.5% |
| 3 | Apparent average (medium) mass in dry condition | Test according to BS 6432-84 in test tube of 50 × 50 mm | 16.7 kg/m$^2$ |
| 4 | Water absorption after 19 hours of immersion | Test according to BS 6432-84 in test tube of 50 × 50 mm | 23.7% |
| 5 | Apparent porosity | Test according to BS 6432-84 in test tube of 50 × 50 mm | 32.2% |

BS = British Standard
STAS = Rumanian Standard

Table 6 shows the test results of the density of the present Logicore board.

TABLE 6

| Test denomination | Denomination of test tubes and procedure | Results kg/m$^3$ |
|---|---|---|
| 1 Density in dry condition | Test in test tube with dimensions of 30 × 6 × 1.54-1.55 cm according to STAS 2160/88 | 1.198 |
| 2 Apparent density in dry condition | Test according to BS 6432-84, chap. 5, in test tubes of 50 × 50 mm | 1.011 |
| 3 Medium (average) apparent density in wet condition | Test according to BS 6432-84, chap. 5, in test tubes of 50 × 50 mm | 1.335 |

BS = British Standard
STAS = Rumanian Standard

The present Logicore board uses a waste mineral product which has no present use. By converting useless, considered environmental hazard material into a useful construction board, the present invention solves an important ecological problem. The present Logicore board is easy to produce and importantly is fire-proof. Therefore, it does not require any kind of fire-proofing treatment prior to use. Moreover, the board is resistant to acid corrosion and thus can be used in a corrosive environment.

The foregoing is illustrative of the principles of the present invention. Numerous modifications to the method for making the present Logicore board can be readily contemplated by one skilled in the art without departing from the scope and breadth of the present disclosure. For example, the ratio between the resin and the hardener of the synthetic adhesive and the ratio between the components need not be exactly limited to the ones presently disclosed, as other ratios could be contemplated without changing the physical and mechanical properties of the present invention. Moreover, the cold and hot pressure and the time duration of the pressing need not be limited solely to the ones specifically disclosed, as one skilled in the art could have contemplated using other pressure/time variation without any undue experimentation and without departing from the scope and breath of the present invention.

We claim:

1. A method of manufacturing a lignite ash-slag construction board comprising the steps of:
    mixing lignite ash-slag with a synthetic adhesive;
    separately mixing wood particles with said adhesive;
    combining the lignite ash-slag mixture with the wood particle mixture;
    forming the combined mixture into a blanket or a mat;
    cold pressing the blanket of the combined mixture;
    heat pressing the cold pressed blanket of the mixture and thereby forming said board.

2. A method according to claim 1, wherein said synthetic adhesive consists of a urea-formaldehyde resin of P type and a hardener.

3. A method according to claim 2, wherein said hardener consists essentially of 1 weight % of maleic anhydride, 10 weight % of ammonium chloride, 10 weight % of technique urea and 10 weight % of technic ammonium of 25% concentration and 69 weight % of water.

4. A method according to claim 3, wherein said adhesive mixed with said lignite ash-slag consists of 9 parts of said resin and 1 part of said hardener, and wherein said adhesive mixed with said wood particles consists of 10 parts of said resin and 1 part of said hardener.

5. A method according to claim 2, wherein the temperature of said heat pressing is at the temperature of the poly-condensation of said urea-formaldehyde resin, which is 155° C.

6. A method according to claim 5, wherein said cold pressing is at a room temperature, the pressure of 15 kgF/cm$^2$ for about 5 minutes.

7. A method according to claim 6, wherein said heat pressing is at said poly-condensation temperature of 155° C., the pressure of 30 kgF/cm$^2$ for about 20 minutes.

* * * * *